(12) United States Patent
Chaudet et al.

(10) Patent No.: US 12,187,285 B2
(45) Date of Patent: Jan. 7, 2025

(54) TORQUE VECTORING SYSTEM, METHOD AND ASSOCIATED VEHICLE

(71) Applicant: RENAULT S.A.S., Boulogne Billancourt (FR)

(72) Inventors: Michel Chaudet, Breuillet (FR); Sebastien Fontaine, Montigny le Bretonneux (FR); Olivier Ghillebaert, Cachan (FR)

(73) Assignee: RENAULT S.A.S., Boulogne Billancourt (FR)

( * ) Notice: Subject to any disclaimer, the term of this patent is extended or adjusted under 35 U.S.C. 154(b) by 0 days.

(21) Appl. No.: 18/565,584

(22) PCT Filed: Jun. 1, 2022

(86) PCT No.: PCT/EP2022/064970
§ 371 (c)(1),
(2) Date: Nov. 30, 2023

(87) PCT Pub. No.: WO2022/253923
PCT Pub. Date: Dec. 8, 2022

(65) Prior Publication Data
US 2024/0278786 A1 Aug. 22, 2024

(30) Foreign Application Priority Data
Jun. 3, 2021 (FR) ..................................... 21 05861

(51) Int. Cl.
*B60W 30/188* (2012.01)
(52) U.S. Cl.
CPC ..... *B60W 30/188* (2013.01); *B60W 2510/207* (2013.01); *B60W 2520/14* (2013.01);
(Continued)

(58) Field of Classification Search
CPC ......... B60W 30/188; B60W 2510/207; B60W 2520/14; B60W 2540/18; B60W 2710/083; B60W 2720/406
See application file for complete search history.

(56) References Cited

U.S. PATENT DOCUMENTS 8,886,381 B2 * 11/2014 Ozaki ..................... B60L 15/20
180/65.7
2004/0176899 A1 * 9/2004 Hallowell ........... B60L 15/2036
701/84
(Continued)

FOREIGN PATENT DOCUMENTS

EP 2 576 298 B1 5/2015
GB 2480852 A * 12/2011 .............. B60L 11/00

OTHER PUBLICATIONS

International Search report issued Sep. 8, 2022 in PCT/EP2022/064970, filed on Jun. 1, 2022, 3 pages.
(Continued)

*Primary Examiner* — Justin Holmes
(74) *Attorney, Agent, or Firm* — Oblon, McClelland, Maier & Neustadt, L.L.P.

(57) ABSTRACT

A system vectors torque between two wheels of a rear axle of an electric motor vehicle that are disposed on either side of the vehicle and are each driven by an electric motor in order to distribute a torque between the two wheels. The system includes a first torque setpoint generator, a second slip correction torque generator, a detector for detecting oversteer or understeer of the vehicle during the acceleration phase when turning, a third skid correction torque generator, a corrected-torque set point generator, and a controller for controlling the first electric motor based on the first corrected-torque set point and for controlling the second electric motor based on the second corrected-torque setpoint.

9 Claims, 6 Drawing Sheets

(52) U.S. Cl.
CPC ... *B60W 2540/18* (2013.01); *B60W 2710/083* (2013.01); *B60W 2720/406* (2013.01)

(56) References Cited

U.S. PATENT DOCUMENTS

| | | | |
|---|---|---|---|
| 2004/0199321 A1* | 10/2004 | Lin | B60T 8/17551 |
| | | | 180/197 |
| 2007/0021875 A1* | 1/2007 | Naik | B60W 30/045 |
| | | | 701/72 |
| 2013/0144476 A1 | 6/2013 | Pinto et al. | |
| 2021/0046922 A1 | 2/2021 | Su et al. | |

OTHER PUBLICATIONS

French Preliminary Search Report issued Nov. 29, 2021 in FR Application 21 05861, filed on Jun. 3, 2021, 3 pages (with English translation of Categories of Cited Documents).

Koehler et al. "Energy-Efficiency Optimization of Torque Vectoring Control for Battery Electric Vehicles", IEEE Intelligent Transportation Systems Magazine, vol. 9, No. 3, 2017, pp. 59-74.

Zhai et al. "Electronic Stability Control Based on Motor Driving and Braking Torque Distribution for a Four In-Wheel Motor Drive Electric Vehicle", IEEE Transactions on Vehicular Technology, vol. 65, No. 6, 2016, pp. 4726-4739.

\* cited by examiner

TORQUE VECTORING SYSTEM, METHOD AND ASSOCIATED VEHICLE

The present invention relates to a system for vectoring torque between two wheels of a rear axle of an electric motor vehicle.

BACKGROUND

The present invention more particularly relates to a system for vectoring torque between two wheels of a rear axle of an electric motor vehicle that are disposed on either side of the vehicle and are each driven by an electric motor for distributing a torque between the two wheels, to a method for implementing such a system and to an electric motor vehicle comprising electric motors that drive the rear wheels and are controlled by said system.

In general, an electric motor vehicle comprises a traction battery dimensioned to ensure the vehicle has sufficient range.

Such a battery is generally heavy, and therefore the additional mass of the battery makes the mass of the vehicle notably heavier.

This additional mass adversely affects the roadholding of the vehicle, notably the agility of a sporty vehicle, such that the sensations felt by the driver are adversely affected.

It is therefore necessary to improve the roadholding of the vehicle in complete safety for the driver.

It is known to unequally distribute a drive torque supplied to the front or the rear of the vehicle (torque vectoring method) to create a yaw moment when the vehicle is cornering in order to improve the roadholding of the vehicle.

The drive torque can also be supplied unequally over the two wheels of one and the same axle.

Document EP2611661 discloses a method for controlling a torque vectoring mechanism for distributing the torque between a right-hand wheel and a left-hand wheel according to a final torque control value.

The final torque control value is equal to the difference between a first control value which depends on a yaw rate and a setpoint yaw rate, and a second control value which depends on a combined slip value of the two wheels.

However, the method does not control the relative slipping of the wheels and does not intend for closed-loop control of the yaw rate of the vehicle, such that the behavior of the vehicle is not safe in all situations and adversely affects the vehicle stability, the method possibly resulting in the vehicle being driven in a maneuver referred to as "going into a spin".

BRIEF SUMMARY

It is therefore proposed to overcome all or some of the drawbacks of the torque vectoring systems for an electric vehicle according to the prior art, notably by improving the stability of said vehicle.

In the light of the preceding text, an object of the invention is a method for vectoring torque between two wheels of a rear axle of an electric motor vehicle that are disposed on either side of the vehicle and are each driven by an electric motor for distributing a torque between the two wheels, the method comprising:

generating a first torque setpoint applied to a first wheel driven by a first electric motor and a second torque setpoint applied to the second wheel driven by the second electric motor on the basis of an acceleration torque setpoint of the vehicle, the speed of the vehicle, the steering wheel angle, the distance between the two wheels, the transverse acceleration of the vehicle, and the torque characteristics supplied by each motor.

The method also comprises:

generating a first slip correcting torque intended for application to the first wheel and a second slip correcting torque intended for application to the second wheel to eliminate relative slipping between the two wheels on the basis of the distance between the wheels, the yaw rate of the vehicle, the mode of each electric motor, the rear axle ratio and the type of tire mounted on the wheels, detecting oversteer or understeer of the vehicle when cornering during an acceleration phase on the basis of a yaw rate setpoint and the yaw rate, generating a first skid correcting torque intended for application to the first wheel and a second skid correcting torque intended for application to the second wheel to neutralize the oversteer or understeer of the vehicle on the basis of the yaw rate setpoint, the yaw rate and the transverse acceleration of the vehicle, determining a first corrected torque setpoint on the basis of the first torque setpoint, the first slip correcting torque and the first skid correcting torque, and determining a second corrected torque setpoint on the basis of the second torque setpoint, the second slip correcting torque and the second skid correcting torque, and controlling the first electric machine on the basis of the first corrected torque setpoint and controlling the second electric machine on the basis of the second corrected torque setpoint.

Advantageously, the generation of a first slip correcting torque and a second slip correcting torque comprises closed-loop control of a slip correcting torque on the basis of a deviation between an Ackermann coefficient equal to the distance between the two wheels multiplied by the yaw rate of the vehicle and the speed deviation between the two wheels such that the deviation is zero, the first and second slip correcting torques being determined on the basis of the slip correcting torque when the deviation is zero, the speed deviation being determined on the basis of the distance between the wheels, the mode of each electric motor, the rear axle ratio and the type of tire mounted on the wheels.

Preferably, the detection of oversteer or understeer of the vehicle when cornering and during an acceleration phase comprises:

determining a yaw rate setpoint on the basis of a bicycle model of the vehicle, determining a first difference between the absolute value of the setpoint yaw rate and the absolute value of the yaw rate, comparing the first difference to a threshold, and determining oversteer or understeer of the vehicle depending on the result of the comparison.

Advantageously, if the first difference is greater than or equal to the threshold, the vehicle exhibits understeer, and if the difference is less than the threshold, the vehicle exhibits oversteer.

Preferably, the generation of the first and second skid correcting torques comprises determining a second difference between the setpoint yaw rate and the yaw rate, if the second difference is within a detection range defined by two detection thresholds of opposite signs or the vehicle is not in an acceleration phase, the first and second skid correcting torques are zero, if the second difference is not within the detection range, the method comprises:

closed-loop control of a skid correction torque on the basis of the second difference such that the second deviation is zero, a skid correcting torque being equal to the correction torque if the second difference is zero, and selecting one of the rear wheels on which the skid correction torque is intended to be subtracted as a function of the oversteer or understeer of the vehicle and the transverse acceleration of the vehicle, the first skid correcting torque being equal to the skid correcting torque and the second skid correcting torque being zero if the first wheel is selected, and conversely if the second wheel is selected.

Advantageously, the selection of the rear wheel on which the skid correcting torque is subtracted comprises determining the rear wheel on the inside of the corner and the wheel on the outside of the corner as a function of the sign of the transverse acceleration, wherein if the transverse acceleration is positive along a reference axis oriented toward the left of the vehicle in the normal running direction, the outside rear wheel is the right-hand rear wheel coinciding with the second wheel in the normal running direction of the vehicle and the inside rear wheel is the left-hand rear wheel coinciding with the first wheel, and conversely if the transverse acceleration is negative along the reference axis, the skid correcting torque being intended to be subtracted at the outside wheel if the vehicle exhibits oversteer and at the inside wheel if the vehicle exhibits understeer.

Preferably, the determination of a first corrected torque setpoint and the determination of a second corrected torque setpoint comprises:

calculating a first intermediate setpoint equal to the subtraction of the first slip correcting torque and the first skid correcting torque from the first torque setpoint, calculating a second intermediate setpoint equal to the subtraction of the second slip correcting torque and the second skid correcting torque from the second torque setpoint, and wherein:

if the vehicle is in an acceleration phase, determining a first minimum value between the first intermediate setpoint and the maximum torque value supplied by the first electric motor, then determining a first maximum value between the first minimum value and zero, the first corrected torque setpoint being equal to the first maximum value, and determining a second minimum value between the second intermediate setpoint and the maximum torque value supplied by the second electric motor, and then determining a second maximum value between the second minimum value and zero, the second corrected torque setpoint being equal to the second maximum value, if the vehicle is in a deceleration phase, determining a first maximum value between the first intermediate setpoint and the minimum torque value supplied by the first electric motor, then determining a first minimum value between the first maximum value and zero, the first corrected torque setpoint being equal to the first minimum value, and determining a second maximum value between the second intermediate setpoint and the minimum torque value supplied by the second electric motor, and then determining a second minimum value between the second maximum value and zero, the second corrected torque setpoint being equal to the second minimum value.

Another object of the invention is a system for vectoring torque between two wheels of a rear axle of an electric motor vehicle that are disposed on either side of the vehicle and are each driven by an electric motor for distributing a torque between the two wheels, the system comprising:

first generating means for generating a first torque setpoint applied to a first wheel driven by a first electric motor and a second torque setpoint applied to the second wheel driven by the second electric motor on the basis of an acceleration torque setpoint of the vehicle, the speed of the vehicle, the steering wheel angle, the distance between the two wheels, the transverse acceleration of the vehicle, and the torque characteristics supplied by each motor.

The method also comprises:

second generating means for generating a first slip correcting torque intended for application to the first electric motor and a second slip correcting torque intended for application to the second electric motor to eliminate relative slipping between the two wheels on the basis of the distance between the wheels, the yaw rate of the vehicle, the mode of each electric motor, the rear axle ratio and the type of tire mounted on the wheels, detecting means for detecting oversteer or understeer of the vehicle during an acceleration phase when cornering on the basis of a yaw rate setpoint and the yaw rate, third generating means for generating a first skid correcting torque intended for application to the first wheel and a second skid correcting torque intended for application to the second wheel to neutralize the oversteer or understeer of the vehicle on the basis of the yaw rate setpoint, the yaw rate and the transverse acceleration of the vehicle, determining means for determining a first corrected torque setpoint on the basis of the first torque setpoint, the first slip correcting torque and the first skid correcting torque, and determining a second corrected torque setpoint on the basis of the second torque setpoint, the second slip correcting torque and the second skid correcting torque, and controlling means for controlling the first electric machine on the basis of the first corrected torque setpoint and controlling the second electric machine on the basis of the second corrected torque setpoint.

Another object of the invention is an electric motor vehicle having a rear axle provided with two wheels disposed on either side of the vehicle, two electric motors each driving a rear wheel, and a torque vectoring system as defined above which is connected to the two electric motors.

BRIEF DESCRIPTION OF THE DRAWINGS

Other aims, features and advantages of the invention will become apparent on reading the following description, which is given solely by way of non-limiting example and with reference to the appended drawings, in which.

DETAILED DESCRIPTION

Figure 1:
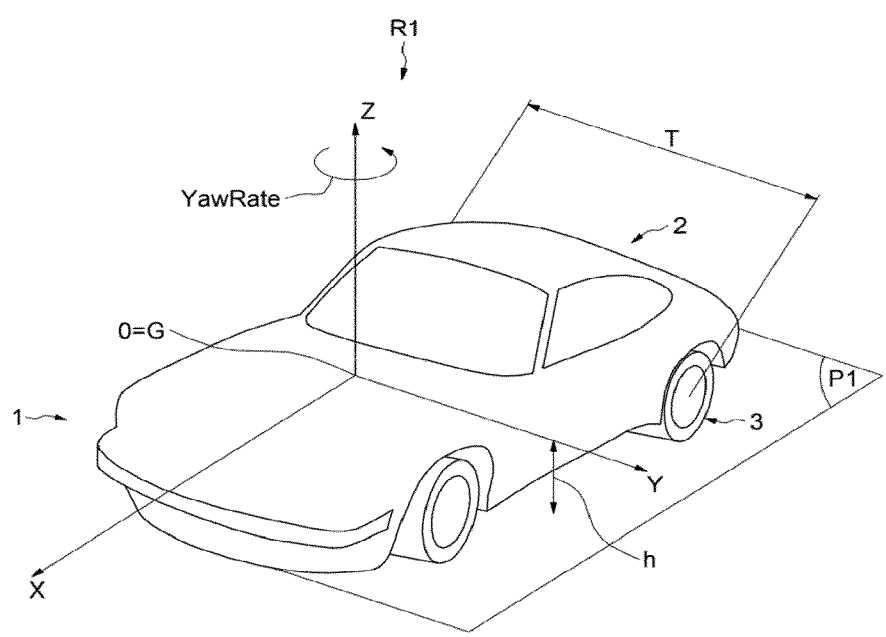
FIG. 1 illustrates an electric motor vehicle.

FIG. 1 illustrates an electric motor vehicle 1 oriented according to an orthonormal reference system R1 (O, X, Y, Z) placed on a plane P1 representing a traffic lane.

The reference system R1 comprises an origin O, a first axis X oriented in a front-rear direction of the vehicle 1, a second axis Y along a transverse direction of the vehicle which is oriented toward the left of the vehicle 1 in the normal running direction of the vehicle 1, and a third axis Z along a vertical direction of the vehicle.

The origin O of the reference system R1 coincides with the center of gravity G of the vehicle 1 disposed at a distance h from the point of contact of the tires with the traffic lane P1 along the axis Z.

The rear axle 2 of the vehicle 1 comprises two wheels 3, 4 that are disposed on either side of the vehicle and are each driven by an electric motor 5, 6 (not visible).

The wheels 3, 4 are separated by the rear track T of the vehicle 1.

A first wheel 3 is disposed on the left-hand side of the vehicle 1 and the second wheel 4 is disposed on the right-hand side of the vehicle 1 in the normal running direction of the vehicle 1.

The distance h and the rear track T are measured in meters.

YawRate is presented as the rotational speed of the vehicle 1 along the axis Z or yaw rate and is counted as positive when the vehicle 1 rotates toward the left of the vehicle 1 in the normal running direction and as negative in the other direction. The rotational speed YawRate of the vehicle 1 along the axis Z is measured in rad/s.

The transverse acceleration of the vehicle 1 along the axis Y is referred to as gammat and is counted as positive if it is directed toward the left of the vehicle 1 in the normal running direction. The transverse acceleration gammat is measured in m/s$^2$.

The gravitational constant is denoted g.

Figure 2:
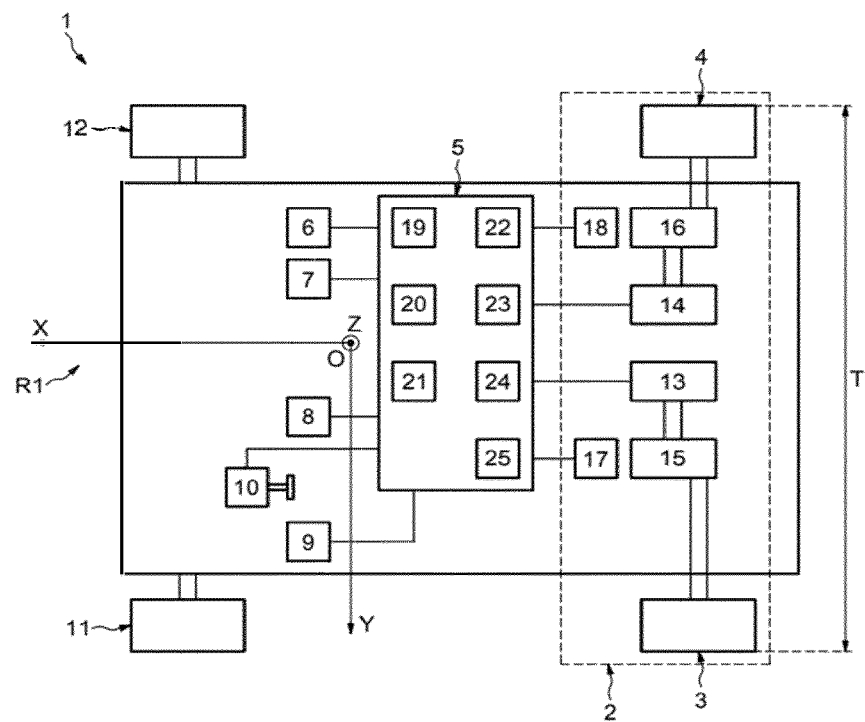
FIG. 2 schematically illustrate an electric motor vehicle according to the invention.

FIG. 2 illustrates the vehicle 1 comprising a rear axle 2, a torque vectoring system 5 for vectoring torque between the two rear wheels 3, 4, an acceleration sensor 6 measuring the transverse acceleration gammat of the vehicle 1 and a rotational speed sensor 7 measuring the rotational speed YawRate of the vehicle 1 that are connected to the system 5, an acceleration setpoint device 8 and a vehicle speed sensor 9 that is connected to the system 5.

The acceleration setpoint device 8 comprises, for example, an accelerator pedal which is manipulated by the driver of the vehicle 1 and supplies an acceleration or deceleration torque setpoint DvTq-Req for the vehicle 1.

It should be noted that when DvTq-Req has a positive value, the setpoint device 8 supplies an acceleration torque setpoint and in the reverse case it supplies a deceleration torque setpoint.

The vehicle 1 moreover comprises a steering wheel 10 for orienting the front wheels 11 and 12 of the vehicle 1 which supplies a rotational angle of the steering wheel av to the system 5, which is measured in degrees in relation to its neutral position and is counted as positive in the counter-clockwise direction of rotation and as negative in the opposite direction.

The front wheels 11 and 12 are not driven by a motor.

According to another embodiment, the vehicle 1 comprises an electric motor driving the front wheels 11, 12 via a differential gear, the torque setpoint DvTq-Reg then being distributed over the front and rear wheels of the vehicle.

The rear axle 2 comprises a first and a second electric motor 13, 14 which are controlled by the system 5 and respectively drive the first and the second rear wheel 3, 4 via a first and a second differential gear 15, 16.

It is assumed in the following text that the differential gears 15, 16 have the same kinematic ratio kgear.

In a variant, the differential gears 15, 16 may have different kinematic ratios.

The axle 2 moreover comprises a first and a second rotational speed sensor 17, 18 respectively supplying the rotational speed of the first and the second motor 13, 14 to the system 5.

The system 5 distributes a traction torque of the vehicle 1 between the two rear wheels 3, 4 and comprises:

first generating means 19 for generating a first torque setpoint C_RL applied to the first wheel 3 and a second torque setpoint C_RR applied to the second wheel 4 on the basis of the acceleration setpoint DvTq-Reg of the vehicle, the speed V of the vehicle, the steering wheel angle av, the distance T between the two rear wheels 3, 4, the transverse acceleration gammat, and the torque characteristics supplied by each motor 13, 14, second generating means 20 for generating a first slip correcting torque C_RL_bf1 intended for application to the first wheel 3 and a second slip correcting torque C_RR_bf1 intended for application to the second wheel 4 to eliminate relative slipping between the two wheels 3, 4 on the basis of the distance T between the wheels 3, 4, the yaw rate YawRate of the vehicle, the mode of each electric motor 13, 14, the ratio kgear and the type of tire mounted on the wheels 3, 4, detecting means 21 for detecting oversteer or understeer of the vehicle 1 when cornering during an acceleration phase on the basis of a yaw rate setpoint YawRateT and the yaw rate YawRate, third generating means 22 for generating a first skid correcting torque C_RL_bf2 intended for application to the first wheel 3 and a second skid correcting torque C_RR_bf2 intended for application to the second wheel 4 to neutralize the oversteer or understeer of the vehicle 1 on the basis of the yaw rate setpoint YawRateT, the yaw rate YawRate and the transverse acceleration gammat, determining means 23 for determining a first corrected torque setpoint C_RRL on the basis of the first torque setpoint C_RL, the first slip correcting torque C_RL_bf1 and the first skid correcting torque C_RL_bf2, and determining a second corrected torque setpoint C_RRR on the basis of the second torque setpoint C_RR, the second slip correcting torque C_RR_bf1 and the second skid correcting torque C_RR_bf2, and controlling means 24 for controlling the first electric machine 13 on the basis of the first corrected torque setpoint C_RRL and controlling the second electric machine 14 on the basis of the second corrected torque setpoint C_RRR.

The system 5 moreover comprises a processing unit 25 implementing the first, second and third generating means 19, 20, 22, the detecting means 21, the determining means 23 and the controlling means 24.

It is assumed that the acceleration setpoint DvTq-Req controls exclusively the rear axle 2.

The torque characteristics supplied by each motor 13, 14 comprise the maximum torque and the minimum torque of each electric motor.

The maximum torque and the minimum torque supplied by the first motor 13 are denoted Cmax13 and Cmin13, and the maximum torque and minimum torque supplied by the second motor 14 are denoted Cmax14 and Cmin14.

It is assumed that the rear wheels 3, 4 are equipped with tires having a radius under load Rwheel measured in meters.

FIGS. 3 to 9 illustrate one exemplary embodiment of the system 5.

It is assumed that the acceleration setpoint device 7 supplies the torque setpoint DvTq-Req with a positive value.

Figure 3:
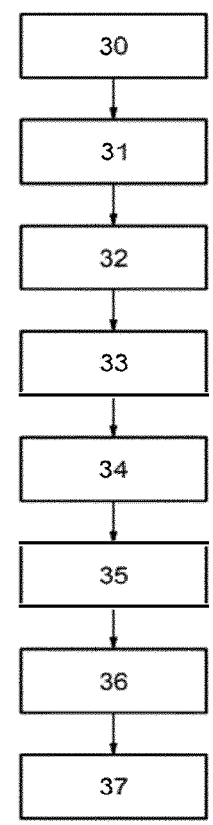
FIG. 3 illustrates a method for generating first and second torque setpoints.

The first generating means 19 generate the first torque setpoint C_RL applied to the first wheel 3 and the second torque setpoint C_RR applied to the second wheel 4 (FIG. 3, steps 30 to 37).

The torque setpoints C_RL and C_RR are generated such that excess torque is provided to the rear wheel subject to the most load and a torque is removed from the rear wheel subject to the least load, for example when the vehicle 1 is cornering, the wheel on the outside of the corner being the wheel subject to the most load and the wheel on the inside of the corner being the wheel subject to the least load.

During step 30, the first generating means 19 determine a first correction torque factor alpha on the basis of a table of data depending on the speed V of the vehicle 1 and the steering wheel angle av, which varies between 0 and 1.

The table of data is for example determined on the basis of prior tests conducted in high-grip conditions of the vehicle 1 generally on dry ground to determine correction torque factor values that provide the correct stability of the vehicle 1 in these conditions.

During step 31, the first generating means 19 determine a load transfer ratio transfer_ratio:

$$\text{transfer\_ratio} = 2 \cdot h \cdot \frac{\text{abs}(gammat)}{T \cdot g} \quad (1)$$

where abs( ) is the absolute value function.

The load transfer ratio transfer_ratio represents a fraction of the mass of the vehicle 1 exerted on the outside rear wheel of the vehicle 1 under the effect of centrifugal acceleration when cornering, and the fraction of mass removed from the inside wheel.

During a step 32, the first generating means 19 determine if the vehicle 1 is subject to clean steering.

The first means 19 compare the product of the value of the steering wheel angle av and the transverse acceleration gammat with a steering threshold, for example equal to −10°·m/s.

If the product calculated is greater than the steering threshold, a Boolean value BRAQ equal to 1 represents clean steering. In the reverse case, the Boolean value BRAQ is equal to 0, the vehicle 1 being in opposite lock or the steering wheel being virtually in the neutral position.

During step 33, the first means 19 determine a second torque correction factor alpha1:

$$\text{alpha1} = \min(\text{alpha, transfer\_ratio}) \cdot BRAQ \quad (2)$$

where min( ) selects the minimum value from the values alpha and transfer ratio in order to take into account average-grip conditions of the vehicle 1, for example when traveling on a wet or icy road such that the transfer of torque between the rear wheel subject to most load and the rear wheel subject to least load does not destabilize the vehicle 1.

During a step 34, the first means 19 determine open-loop torque setpoints C_Ro_bo and C_Ri_bo for application respectively to the outside and inside rear wheels:

$$C\_Ro\_bo = \frac{DvTq - Req}{2} \cdot (1 + \text{alpha1}) \quad (3)$$

$$C\_Ri\_bo = C\_Ro\_bo - 2 \cdot \frac{DvTq - Req}{2} \cdot \text{alpha1} \quad (4)$$

During a step 35, the first means 19 associate the outside rear wheel with one of the rear wheels 3, 4 of the vehicle 1 and the inside rear wheel with the other rear wheel 3, 4, and limit the open-loop torque setpoints C_Ro_bo and C_Ri_bo to the torque characteristics supplied by each motor 13, 14.

If the steering wheel angle av is positive (steered in the counterclockwise direction), the outside wheel coincides with the second rear wheel 4 and the inside wheel coincides with the first rear wheel 3.

The maximum setpoints C_Ro_max and C_Ri_max of the setpoints C_Ro_bo and C_Ri_bo are equal to:

$$C\_Ro\_max = Cmax14 \quad (5)$$

$$C\_Ri\_max = Cmax13 \quad (6)$$

and the minimum setpoints C_Ro_min and C_Ri_min of the setpoints C_Ro_bo and C_Ri_bo are equal to:

$$C\_Ro\_min = Cmin14 \quad (7)$$

$$C\_Ri\_min = Cmin13 \quad (8)$$

If the steering wheel angle av is negative (steered in the clockwise direction), the outside wheel coincides with the first rear wheel 3 and the inside wheel coincides with the second rear wheel 4.

The maximum setpoints C_Ro_max and C_Ri_max of the setpoints C_Ro_bo and C_Ri_bo are equal to:

$$C\_Ro\_max = Cmax13 \quad (9)$$

$$C\_Ri\_max = Cmax14 \quad (10)$$

and the minimum setpoints C_Ro_min and C_Ri_min of the setpoints C_Ro_bo and C_Ri_bo are equal to:

$$C\_Ro\_min = Cmin13 \quad (11)$$

$$C\_Ri\_min = Cmin14 \quad (12)$$

During a step 36, the first means 19 determine final-loop torques C_Ro_final and C_Ri_final such that:

$$C\_Ro\_final = \max(\min(C\_Ro\_bo, C\_Ro\_max), C\_Ro\_min) \quad (13)$$

$$C\_Ri\_final = \max\left(\min\left(C\_Ro\_final - 2 \cdot \frac{DvTq-Req}{2} \cdot alpha\ 1,\right.\right.$$
$$\left.\left. C\_Ri\_max\right), C\_Ri\_min\right) \quad (14)$$

In a variant, $$C\_Ri\_final = \max(\min(C\_Ro\_bo, C\_Ri\_max), C\_Ri\_min) \quad (15)$$

During the step 37, if the steering wheel angle av is positive (steered in the counterclockwise direction), the first generating means 19 generate the first torque setpoint C_RL and the second torque setpoint C_RR such that:

$$C\_RL = C\_Ri\_final \quad (16)$$
$$C\_RR = C\_Ro\_final \quad (17)$$

and if the angle av is negative such that:

$$C\_RL = C\_Ro\_final \quad (18)$$
$$C\_RR = C\_Ri\_final \quad (19)$$

The second generating means 20 generate the first slip correcting torque C_RL_bf1 and the second slip correcting torque C_RR_bf1 to eliminate relative slipping between the rear wheels 3, 4 generated for example when each rear wheel travels in a part of the traffic lane exhibiting different grip values.

The second generating means 20 make it possible to ensure the stability of the vehicle 1 in a straight line when there is a different grip situation between the two rear wheels 3, 4.

Figure 4:
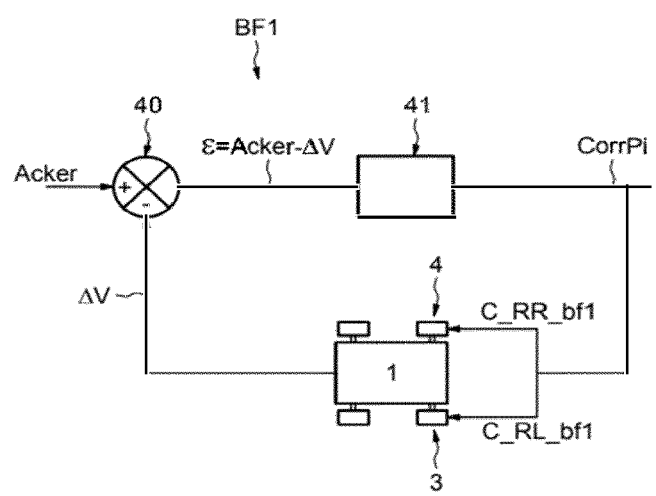
FIG. 4 illustrates a first closed control loop of a second generating means.

The second generating means 20 comprise a first closed control loop BF1 illustrated in FIG. 4.

The first closed control loop BF1 has a summer 40 and a controller 41 of the proportional integral type.

The parameters of the controller 41 (the proportional action gain and the integral action gain) are determined empirically by tests conducted on the vehicle 1.

The second means 20 determine an Acker coefficient equal to the setpoint from the control loop BF1 applied to an addition input of the summer 40, and equal to:

$$Acker = T \cdot Yaw\ Rate \quad (20)$$

where T is the track of the rear axle 2 and YawRate is the yaw rate of the vehicle 1.

The Acker coefficient represents the normal speed deviation between the two rear wheels, right-hand 3 and left-hand 4, when neither of the two is slipping or if the two wheels slip identically.

The second means 20 continually determine the real speed deviation ΔV between the left-hand rear wheel 3 and the right-hand rear wheel 4:

$$\Delta V = \frac{RmotRL - RmotRR}{k\ \text{gear}} \cdot R\ \text{wheel} \quad (21)$$

where RmotRL is the rotational speed of the first electric motor 13, RmotRR is the rotational speed of the second electric motor 14, kgear is the kinematic ratio and Rwheel is the radius under load.

The real speed deviation ΔV is applied to a subtraction input of the summer 40.

The controller 41 determines a slip correcting torque CorrPI on the basis of the deviation ε between the Acker coefficient and the real speed deviation ΔV such that the deviation ε is zero.

The slip correcting torque CorrPI makes it possible to determine the first slip correcting torque C_RL_bf1 and the second slip correcting torque C_RR_bf1 that are applied to the rear wheels 3, 4.

The first slip correcting torque C_RL_bf1 is equal to:

$$C\_RL\_bf1 = \max(corrPI, \max((-G \cdot corrPI - Ctr) \cdot Acclim, 0)) \quad (22)$$

and the second slip correcting torque C_RR_bf1 is equal to:

$$C\_RR\_bf1 = \max(-corrPI, \max((G \cdot corrPI - Ctr) \cdot Acclim, 0)) \quad (23)$$

where G is a ratio for correction of the torque transfer, Ctr is a torque transfer constant and Acclim is a limitation depending on the transverse acceleration. G, Ctr and Acclim are determined by tests.

The first control loop BF1 removes some of the torque applied to the rear wheel which slips more in relation to the other rear wheel, and removes a fraction of the torque removed from the slipping wheel from the other wheel in order to improve the stability of the vehicle 1 in a straight line.

If the torque setpoint DvTq-Reg has a negative value (deceleration), the first slip correcting torque C_RL_bf1 and the second slip correcting torque C_RL_bf1 have values of zero.

The detecting means 21 and the third generating means 22 make it possible to prevent skidding of the rear wheels 3, 4 in order to ensure the stability of the vehicle 1 when cornering by reducing the torque on one of the rear wheels.

If the torque setpoint DvTq-Reg has a negative value or the vehicle 1 is not cornering, the first skid correcting torque C_RL_bf2 and the second skid correcting torque C_RR_bf2 that are determined by the third generating means 22 have values of zero.

Figure 5:
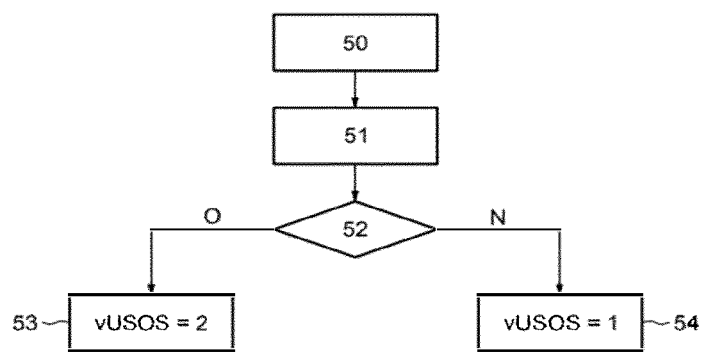
FIG. 5 illustrates a method for detecting oversteer or understeer of the vehicle.

The detecting means 21 detect oversteer or understeer of the vehicle 1 on the basis of a yaw rate setpoint YawRateT and the yaw rate YawRate (FIG. 5, steps 50 to 54).

During a step 50, the detecting means 21 determine a yaw rate setpoint YawRateT on the basis of a bicycle model of the vehicle 1. It should be noted that the bicycle model is known per se.

The yaw rate setpoint YawRateT represents a neutral trajectory of the vehicle 1 when cornering, the vehicle 1 not oversteering or understeering.

It is known that, for high values of the steering wheel angle av, for example greater than 200° to the left or to the right, the setpoint yaw rate YawRateT determined by the bicycle model is overestimated. In order to correct this overestimation, the setpoint yaw rate YawRateT is saturated at a value equal to the admissible maximum transverse acceleration gammatMax divided by the speed V of the vehicle. The admissible maximum transverse acceleration gammatMax is for example equal to 12 m/s$^2$.

Moreover, in the case of opposite lock, when the steering wheel angle av and the yaw rate YawRate have opposite signs, the deviation between the setpoint yaw rate YawRateT and the measured yaw rate YawRate is significant. The deviation is used subsequently in a second closed control loop BF2 to determine the first skid correcting torque C_RL_bf2 and the second skid correcting torque C_RR_bf2. In order to ensure the stability of the second closed control loop BF2, the setpoint yaw rate YawRateT is saturated at 0 in order to prevent differential slipping between the two rear wheels 3, 4.

During a step 51, the detecting means 21 determine a first difference between the absolute value of the setpoint yaw rate YawRateT and the absolute value of the yaw rate YawRate.

If the first difference is greater than a threshold (step 52), the vehicle 1 is understeering, and the detecting means 21 assign the value 2 to a parameter vUSOS indicative of the vehicle 1 exhibiting oversteer or understeer (step 53).

If the first difference is greater than a threshold (step 52), the vehicle 1 exhibits oversteer, and the detecting means 21 assign the value 1 to the parameter vUSOS.

Figure 6:
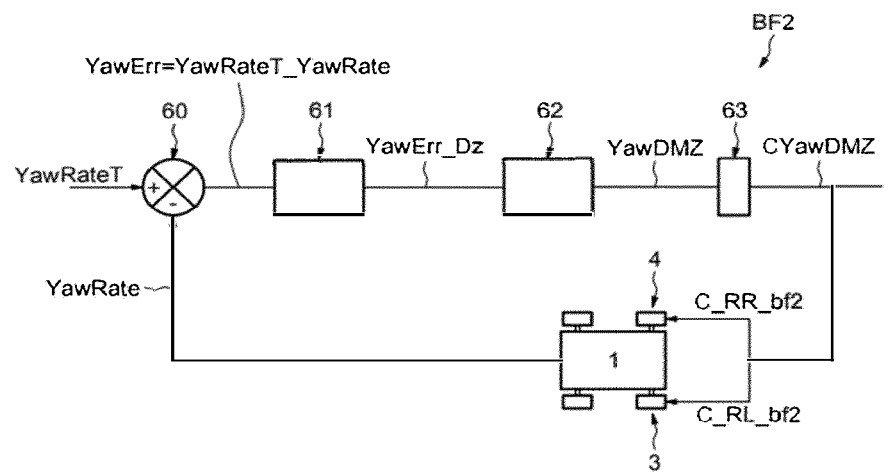
FIG. 6 illustrates a second closed control loop for generating a first skid correcting torque.

The third generating means 22 comprise a second closed control loop BF2 illustrated in FIG. 6 for generating the first skid correcting torque CYawDMZ.

The second closed control loop BF2 has a summer 60, a conditioning module 61, a controller 62 of the proportional derivative type, and a conversion module 63.

The proportional coefficient of the controller 62 is determined on the basis of predetermined tables linking said coefficient to the speed V, to the transverse acceleration gammat and the over-/understeer exhibited by the vehicle 1 (parameter vUSOS).

The tables and the derivative action gain are for example determined empirically by tests conducted on the vehicle 1.

The setpoint yaw rate YawRateT is applied to an addition input of the summer 60 and the yaw rate YawRate measured by the rotational speed sensor 7 is applied to a subtraction input of the summer 60.

An output of the summer 60 supplies a second difference YawErr equal to the difference between the setpoint yaw rate YawRateT and the yaw rate YawRate to the conditioning module 61.

Figure 7:
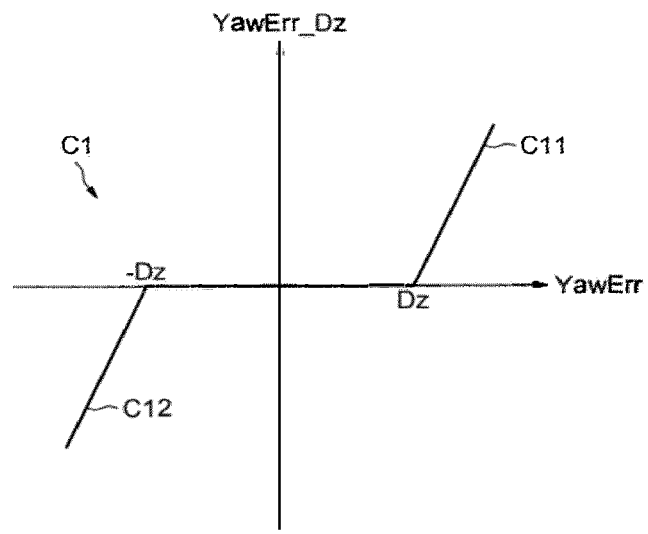
FIG. 7 illustrates a curve of a difference between a setpoint yaw rate and a yaw rate to a conditioning module.

The conditioning module 61 comprises a curve C1, illustrated in FIG. 7, such that if the second difference YawErr is within a detection range defined by two equal detection thresholds −Dz, Dz, the conditioning module 61 supplies a value of zero, deactivating the second control loop BF2, and the first and second skid correcting torques C_RL_bf2, C_RR_bf2 are zero.

If the second difference YawErr is greater than the threshold Dz (curve C11), the module 61 supplies to the controller 62 the value:

$$\text{Yaw Err\_Dz} = \text{Yaw } Err - Dz \qquad (24)$$

and if the second difference YawErr is less than the threshold −Dz (curve C12), the module 61 supplies to the controller 62 the value:

$$\text{Yaw Err\_Dz} = \text{Yaw } Err + Dz \qquad (25)$$

The value of the detection threshold Dz is determined on the basis of predetermined tables linking said threshold to the speed V, to the transverse acceleration gammat and to the over-/understeer exhibited by the vehicle 1 (parameter vUSOS), the tables being determined empirically.

The two thresholds −Dz and Dz have equal values.

In a variant, the two detection thresholds may have different values.

The conditioning module 61 makes it possible to activate the second closed control loop BF2 if the vehicle 1 exhibits significant over- or understeer quantified by the value of the detection threshold Dz such that the second loop BF2 is not activated when trajectory fluctuations of the vehicle 1 are detected, such that the system 5 does not needlessly downgrade the performance of the vehicle 1.

When the module 61 supplies a non-zero value to the controller 62, the controller 62 determines a correction yaw moment YawDMZ and the conversion module 63 converts the correction yaw moment YawDMZ to a skid correction torque CYawDMZ according to:

$$C\text{Yaw}DMZ = \frac{2}{T} \cdot \text{Yaw}DMZ \cdot R \text{ wheel} \qquad (26)$$

The skid correction torque CYawDMZ is determined by the controller 62 such that the second difference YawErr is zero.

The third generating means 22 select one of the rear wheels 3, 4 on which the skid correcting torque CYawDMZ is intended to be subtracted as a function of oversteer or understeer of the vehicle (parameter vUSOS) and the transverse acceleration gammat of the vehicle 1.

Figure 8:
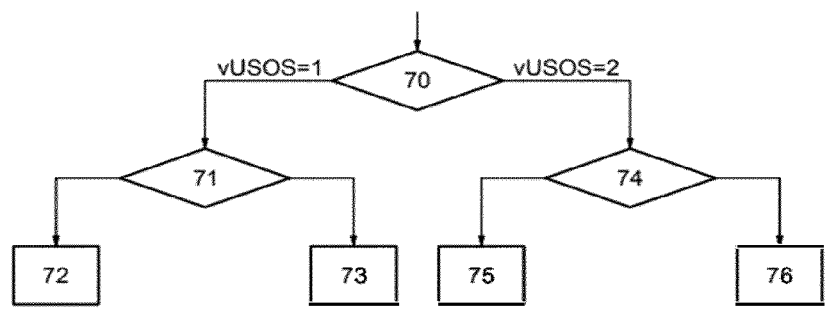
FIG. 8 illustrates a method for selecting a rear wheel on which a skid correcting torque is to be subtracted.
Figure 9:
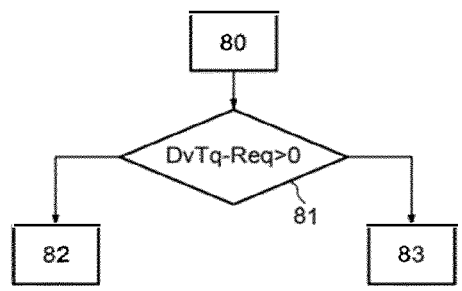
FIG. 9 illustrates a method for determining first and second corrected torque setpoints.

The third generating means 22 determine the rear wheel 3, 4 on the inside of the corner and the wheel 3, 4 on the outside of the corner as a function of the sign of the transverse acceleration gammat and as a function of oversteer or understeer of the vehicle (parameter vUSOS) (FIG. 8).

If the vehicle 1 exhibits oversteer (vUSOS=1) (step 70), and the transverse acceleration gammat is positive along the reference axis oriented toward the left of the vehicle 1 in the normal running direction (step 71), the outside rear wheel is the right-hand rear wheel coinciding with the second rear wheel 4 in the normal running direction of the vehicle 1. The third generating means 22 assign a value of zero to the first skid torque C_RL_bf2 and the absolute value of the skid correction torque CYawDMZ to the second skid torque C_RR_bf2 (step 72).

If the vehicle 1 exhibits oversteer (vUSOS=1) (step 70), and the transverse acceleration gammat is negative along the reference axis oriented toward the left of the vehicle 1 in the normal running direction (step 71), the outside rear wheel is the left-hand rear wheel coinciding with the first rear wheel 3 in the normal running direction of the vehicle 1. The third generating means 22 assign a value of zero to the second skid torque C_RR_bf2 and the absolute value of the skid correction torque CYawDMZ to the first skid torque C_RL_bf2 (step 73).

If the vehicle 1 exhibits understeer (vUSOS=2) (step 70), and the transverse acceleration gammat is positive along the reference axis oriented toward the left of the vehicle 1 in the normal running direction (step 74), the inside rear wheel is the left-hand rear wheel coinciding with the first rear wheel 3 in the normal running direction of the vehicle 1. The third generating means 22 assign a value of zero to the second skid torque C_RR_bf2 and the absolute value of the skid correction torque CYawDMZ to the first skid torque C_RL_bf2 (step 75).

If the vehicle 1 exhibits understeer (vUSOS=2) (step 70), and the transverse acceleration gammat is negative along the reference axis oriented toward the left of the vehicle 1 in the normal running direction (step 74), the inside rear wheel is the right-hand rear wheel coinciding with the second rear wheel 4 in the normal running direction of the vehicle 1. The third generating means 22 assign the absolute value of the skid correction torque CYawDMZ to the second skid torque C_RR_bf2 and a value of zero to the first skid torque C_RL_bf2 (step 76).

The second control loop BF2 removes some of the torque on one of the rear wheels depending on the over-/understeer exhibited by the vehicle 1 when cornering during an acceleration phase to prevent skidding of the rear wheels in order to improve the stability of the vehicle 1.

The determining means 23 determine the first corrected torque setpoint C_RRL and the second corrected torque setpoint C_RRR.

During a step 80, the determining means 23 calculate a first intermediate setpoint cons1 equal to:

$$cons1 = C\_RL - C\_RL\_bf1 - C\_RL\_bf2 \quad (27)$$

and a second intermediate setpoint cons2 equal to:

$$cons2 = C\_RR - C\_RR\_bf1 - C\_RR\_bf2 \quad (28)$$

If the vehicle is in a deceleration phase (DvTq-Req<0), during the step 82, the determining means 23 determine the first corrected torque setpoint C_RRL and the second corrected torque setpoint C_RRR such that:

$$C\_RRL = \min(\max(cons1, C\min 13), 0) \quad (29)$$

$$C\_RRR = \min(\max(cons2, C\min 14), 0) \quad (30)$$

If the vehicle is in an acceleration phase (DvTq-Req>0), during the step 83, the determining means 23 determine the first corrected torque setpoint C_RRL and the second corrected torque setpoint C_RRR such that:

$$C\_RRL = \max(\min(cons1, C\max 13), 0) \quad (31)$$

$$C\_RRR = \max(\min(cons2, C\max 14), 0) \quad (32)$$

The control means 24 control the first electric machine 13 such that it supplies a torque to the first rear wheel 3 equal to the first corrected torque setpoint C_RRL, and the second electric machine 14 such that it supplies a torque to the second rear wheel 3 equal to the second corrected torque setpoint C_RRR.

The control of the electric machines 13, 14 on the basis of the corrected torque setpoints C_RRL and C_RRR makes it possible to confer agility on the electric vehicle 1 while still ensuring its stability independently of the trajectory of the vehicle 1.

The invention claimed is:

1. A method for vectoring torque between two wheels of a rear axle of an electric motor vehicle, including a first wheel and a second wheel that are disposed on either side of the vehicle and are respectively driven by a first electric motor and a second electric motor for distributing a torque between the two wheels, the method comprising:
   generating a first torque setpoint applied to the first wheel driven by the first electric motor and a second torque setpoint applied to the second wheel driven by the second electric motor based on an acceleration torque setpoint of the vehicle, a speed of the vehicle, a steering wheel angle, a distance between the two wheels, a transverse acceleration of the vehicle, and torque characteristics supplied by each motor;
   generating a first slip correcting torque configured to be applied to the first wheel and a second slip correcting torque configured to be applied to the second wheel to eliminate relative slipping between the two wheels based on the distance between the wheels, a yaw rate of the vehicle, a mode of each electric motor, a rear axle kinematic ratio, and a type of tire mounted on the wheels;
   detecting oversteer or understeer of the vehicle when cornering during an acceleration phase based on a yaw rate setpoint and the yaw rate;
   generating a first skid correcting torque configured to be applied to the first wheel and a second skid correcting torque configured to be applied to the second wheel to neutralize the oversteer or understeer of the vehicle based on the yaw rate setpoint, the yaw rate, and the transverse acceleration of the vehicle;
   determining a first corrected torque setpoint based on the first torque setpoint, the first slip correcting torque, and the first skid correcting torque, and determining a second corrected torque setpoint based on the second torque setpoint, the second slip correcting torque, and the second skid correcting torque; and
   controlling the first electric motor based on the first corrected torque setpoint and controlling the second electric motor based on the second corrected torque setpoint.

2. The method as claimed in claim 1, wherein the generating the first slip correcting torque and the second slip correcting torque comprises closed-loop control of a slip correcting torque based on a deviation between an Ackermann coefficient equal to the distance between the two wheels multiplied by the yaw rate of the vehicle and the speed deviation between the two wheels such that the deviation is zero, the first and second slip correcting torques being determined based on the slip correcting torque when the deviation is zero, the speed deviation being determined based on the distance between the wheels, the mode of each electric motor, the rear axle ratio and the type of tire mounted on the wheels.

3. The method as claimed in claim 1, wherein the detecting oversteer or understeer of the vehicle when cornering and during an acceleration phase comprises:
   determining a yaw rate setpoint based on a bicycle model of the vehicle, determining a first difference between the absolute value of the setpoint yaw rate and the absolute value of the yaw rate, comparing the first difference to a threshold, and determining oversteer or understeer of the vehicle depending on the result of the comparison.

4. The method as claimed in claim 3, wherein when the first difference is greater than or equal to the threshold, the vehicle exhibits understeer, and when the difference is less than the threshold, the vehicle exhibits oversteer.

5. The method as claimed in claim 3, wherein the generation of the first and second skid correcting torques comprises determining a second difference between the setpoint yaw rate and the yaw rate, when the second difference is within a detection range defined by two detection thresholds of opposite signs or the vehicle is not in an acceleration phase, the first and second skid correcting torques are zero, and when the second difference is not within the detection range, the method comprises:

closed-loop control of a skid correction torque based on the second difference such that the second deviation is zero, a skid correcting torque being equal to the correction torque when the second difference is zero, and selecting one of the rear wheels on which the skid correction torque is to be subtracted as a function of the oversteer or understeer of the vehicle and the transverse acceleration of the vehicle, the first skid correcting torque being equal to the skid correcting torque and the second skid correcting torque being zero when the first wheel is selected, and conversely when the second wheel is selected.

6. The method as claimed in claim 5, wherein the selection of the rear wheel on which the skid correcting torque is subtracted comprises determining the rear wheel on an inside of a corner and the wheel on an outside of the corner as a function of the sign of the transverse acceleration, and wherein when the transverse acceleration is positive along a reference axis oriented toward the left of the vehicle in a normal running direction, the outside rear wheel is the right-hand rear wheel coinciding with the second wheel in the normal running direction of the vehicle and the inside rear wheel is the left-hand rear wheel coinciding with the first wheel, and conversely when the transverse acceleration is negative along the reference axis, the skid correcting torque being subtracted on the outside wheel when the vehicle exhibits oversteer and on the inside wheel when the vehicle exhibits understeer.

7. The method as claimed in claim 1, wherein the determination of a first corrected torque setpoint and the determination of a second corrected torque setpoint comprises:

calculating a first intermediate setpoint equal to the subtraction of the first slip correcting torque and the first skid correcting torque from the first torque setpoint, calculating a second intermediate setpoint equal to the subtraction of the second slip correcting torque and the second skid correcting torque from the second torque setpoint, and wherein:

when the vehicle is in an acceleration phase, determining a first minimum value between the first intermediate setpoint and the maximum torque value supplied by the first electric motor, then determining a first maximum value between the first minimum value and zero, the first corrected torque setpoint being equal to the first maximum value, and determining a second minimum value between the second intermediate setpoint and the maximum torque value supplied by the second electric motor, and then determining a second maximum value between the second minimum value and zero, the second corrected torque setpoint being equal to the second maximum value, and when the vehicle is in a deceleration phase, determining a first maximum value between the first intermediate setpoint and the minimum torque value supplied by the first electric motor, then determining a first minimum value between the first maximum value and zero, the first corrected torque setpoint being equal to the first minimum value, and determining a second maximum value between the second intermediate setpoint and the minimum torque value supplied by the second electric motor, and then determining a second minimum value between the second maximum value and zero, the second corrected torque setpoint being equal to the second minimum value.

8. A system for vectoring torque between two wheels of a rear axle of an electric motor vehicle, including a first wheel and a second wheel that are disposed on either side of the vehicle and are respectively driven by a first electric motor and a second electric motor for distributing a torque between the two wheels, the system comprising:

first generating means for generating a first torque setpoint applied to the first wheel driven by the first electric motor and a second torque setpoint applied to the second wheel driven by the second electric motor based on an acceleration torque setpoint of the vehicle, a speed of the vehicle, a steering wheel angle, a distance between the two wheels, a transverse acceleration of the vehicle, and torque characteristics supplied by each motor;

second generating means for generating a first slip correcting torque configured to be applied to the first electric motor and a second slip correcting torque configured to be applied to the second electric motor to eliminate relative slipping between the two wheels based on the distance between the wheels, a yaw rate of the vehicle, a mode of each electric motor, a rear axle ratio, and a type of tire mounted on the wheels;

detecting means for detecting oversteer or understeer of the vehicle during an acceleration phase when cornering based on a yaw rate setpoint and the yaw rate;

third generating means for generating a first skid correcting torque configured to be applied to the first wheel and a second skid correcting torque configured to be applied to the second wheel to neutralize the oversteer or understeer of the vehicle based on the yaw rate setpoint, the yaw rate, and the transverse acceleration of the vehicle;

determining means for determining a first corrected torque setpoint based on the first torque setpoint, the first slip correcting torque, and the first skid correcting torque, and determining a second corrected torque setpoint based on the second torque setpoint, the second slip correcting torque, and the second skid correcting torque; and controlling means for controlling the first electric motor based on the first corrected torque setpoint and controlling the second electric motor based on the second corrected torque setpoint.

9. An electric motor vehicle comprising:

a rear axle provided with two wheels that are disposed on either side of the vehicle, two electric motors each driving a rear wheel, and the system for vectoring torque as claimed in claim 8 connected to the two electric motors.

\* \* \* \* \*